US010511679B2

(12) United States Patent
Cashmore et al.

(10) Patent No.: US 10,511,679 B2
(45) Date of Patent: *Dec. 17, 2019

(54) METHOD OF DETERMINING AND TRANSMITTING POTENTIALLY VIRAL MEDIA ITEMS BASED ON THE VELOCITY MEASURE OF ANOTHER MEDIA ITEM EXCEEDING A VELOCITY THRESHOLD SET FOR THAT TYPE OF MEDIA ITEM

(71) Applicant: Mashable, Inc., New York, NY (US)

(72) Inventors: Peter Cashmore, New York, NY (US); Robyn Peterson, New Canaan, CT (US); Chris Heald, Gilbert, AZ (US); Dimitri Dimoulakis, New York, NY (US); Mario Antonetti, Manchester, NH (US); Kevin Gisi, New York, NY (US); Darren Tome, New York, NY (US)

(73) Assignee: MASHABLE, INC., New York, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/658,440

(22) Filed: Jul. 25, 2017

(65) Prior Publication Data

US 2017/0324822 A1 Nov. 9, 2017

Related U.S. Application Data

(63) Continuation of application No. 14/086,021, filed on Nov. 21, 2013, now Pat. No. 9,749,431.

(51) Int. Cl.
*H04L 29/08* (2006.01)
*G06Q 30/02* (2012.01)
*G06F 16/40* (2019.01)

(52) U.S. Cl.
CPC ............. *H04L 67/22* (2013.01); *G06F 16/40* (2019.01); *G06Q 30/02* (2013.01); *G06Q 30/0201* (2013.01)

(58) Field of Classification Search
CPC .... H04L 67/22; G06Q 30/0201; G06Q 30/02; G06F 17/30017; G06F 16/40
See application file for complete search history.

(56) References Cited

U.S. PATENT DOCUMENTS

| 2,430,605 A | 11/1947 | Francona |
| 6,457,028 B1 * | 9/2002 | Pitkow ................ G06F 17/3061 707/999.005 |
| 6,466,918 B1 | 10/2002 | Spiegel et al. |
| 6,904,408 B1 | 6/2005 | McCarthy et al. |

(Continued)

FOREIGN PATENT DOCUMENTS

WO   WO-2010127150 A2 * 11/2010 ............. G06Q 30/02

*Primary Examiner* — Daniel C. Murray
(74) *Attorney, Agent, or Firm* — Squire Patton Boggs (US) LLP (57) ABSTRACT

Systems and techniques are disclosed for publishing related media content based on the velocity measure for media content. The velocity measure for the media content may be determined based on a change in engagement rate such as a change in rate of sharing the media content via social media. The related media content may be published on a media outlet such as a website, blog, and/or an aggregation page and the publication may provide more exposure to the media content.

23 Claims, 6 Drawing Sheets

(56) References Cited

U.S. PATENT DOCUMENTS

| | | | |
|---|---|---|---|
| 7,370,381 B2 | 5/2008 | Tuttle et al. | |
| 7,739,295 B1 | 6/2010 | Agrawal et al. | |
| 7,912,836 B2 | 3/2011 | Tuttle et al. | |
| 7,930,402 B2 | 4/2011 | Swildens et al. | |
| 8,082,511 B2 | 12/2011 | Sobotka et al. | |
| 8,185,431 B2 | 5/2012 | Abboa-Offei | |
| 8,196,045 B2 | 6/2012 | Chandratillake et al. | |
| 8,196,166 B2 | 6/2012 | Roberts et al. | |
| 8,250,211 B2 | 8/2012 | Swildens et al. | |
| 8,275,764 B2 * | 9/2012 | Jeon | H04N 5/44543 707/721 |
| 8,296,253 B2 | 10/2012 | Huberman et al. | |
| 8,296,660 B2 * | 10/2012 | Macadaan | G06F 3/0482 715/745 |
| 8,332,512 B1 * | 12/2012 | Wu | G06Q 30/0254 705/319 |
| 8,463,778 B2 | 6/2013 | Tuttle et al. | |
| 8,489,515 B2 | 7/2013 | Mathur | |
| 8,489,672 B2 | 7/2013 | Sebastian et al. | |
| 8,489,673 B2 | 7/2013 | Sebastian et al. | |
| 8,548,918 B1 | 10/2013 | Amidon et al. | |
| 8,578,028 B2 | 11/2013 | Grigsby et al. | |
| 8,612,869 B2 | 12/2013 | Tonse et al. | |
| 8,626,823 B2 | 1/2014 | Kumar | |
| 8,650,488 B1 | 2/2014 | Wattenhofer et al. | |
| 8,725,858 B1 | 5/2014 | Wu et al. | |
| 8,762,859 B2 | 6/2014 | Macadaan et al. | |
| 8,775,415 B2 | 7/2014 | Jeon et al. | |
| 8,776,112 B2 | 7/2014 | Roberts et al. | |
| 8,788,488 B2 | 7/2014 | Tuttle et al. | |
| 8,788,925 B1 | 7/2014 | van Hoff et al. | |
| 8,806,000 B1 | 8/2014 | Wattenhofer et al. | |
| 8,856,329 B2 | 10/2014 | Black et al. | |
| 8,903,909 B1 | 12/2014 | Marra et al. | |
| 9,037,676 B1 | 5/2015 | Lundh et al. | |
| 9,049,235 B2 * | 6/2015 | Liebmann | H04L 63/20 |
| 9,075,882 B1 | 7/2015 | Ward et al. | |
| 9,088,809 B2 | 7/2015 | Jeon et al. | |
| 9,135,641 B2 | 9/2015 | Macadaan et al. | |
| 9,141,972 B2 | 9/2015 | Tonse et al. | |
| 9,159,082 B2 | 10/2015 | Sobotka et al. | |
| 9,230,212 B2 | 1/2016 | Su | |
| 9,245,252 B2 | 1/2016 | Newton et al. | |
| 9,251,269 B2 | 2/2016 | Lakshmanan et al. | |
| 9,304,976 B1 | 4/2016 | Cashmore et al. | |
| 9,304,979 B2 | 4/2016 | Van Hoff et al. | |
| 9,323,850 B1 | 4/2016 | Lewis et al. | |
| 9,326,025 B2 | 4/2016 | Rao et al. | |
| 9,380,013 B1 | 6/2016 | Cashmore et al. | |
| 9,491,038 B2 | 11/2016 | Hofman et al. | |
| 9,547,832 B2 | 1/2017 | Gordon | |
| 9,571,446 B2 | 2/2017 | Cashmore et al. | |
| 9,621,663 B2 | 4/2017 | Smith et al. | |
| 9,667,732 B2 | 5/2017 | Smith et al. | |
| 9,672,534 B2 | 6/2017 | Mahajan | |
| 9,705,889 B2 * | 7/2017 | Liebmann | H04L 63/20 |
| 10,171,475 B2 * | 1/2019 | Liebmann | H04L 63/20 |
| 10,178,158 B1 * | 1/2019 | Bee | H04L 65/4069 |
| 10,311,525 B1 * | 6/2019 | Owens | G06Q 50/01 |
| 10,353,971 B2 * | 7/2019 | Shivaswamy | G06F 16/9535 |
| 2005/0288954 A1 | 12/2005 | McCarthy et al. | |
| 2006/0085818 A1 * | 4/2006 | Bodlaender | H04N 7/16 725/46 |
| 2006/0218141 A1 | 9/2006 | Tuttle et al. | |
| 2006/0293921 A1 | 12/2006 | McCarthy et al. | |
| 2007/0136115 A1 | 6/2007 | Senturk Doganaksoy et al. | |
| 2007/0288518 A1 | 12/2007 | Crigler et al. | |
| 2008/0016229 A1 | 1/2008 | Lee | |
| 2008/0086688 A1 | 4/2008 | Chandratillake et al. | |
| 2008/0091517 A1 | 4/2008 | Koonce et al. | |
| 2008/0155588 A1 | 6/2008 | Roberts et al. | |
| 2008/0201323 A1 | 8/2008 | Tuttle et al. | |
| 2008/0209339 A1 | 8/2008 | Macadaan et al. | |
| 2008/0209340 A1 | 8/2008 | Tonse et al. | |
| 2008/0209343 A1 | 8/2008 | Macadaan et al. | |
| 2008/0209349 A1 | 8/2008 | Macadaan et al. | |
| 2008/0209350 A1 | 8/2008 | Sobotka et al. | |
| 2008/0209351 A1 | 8/2008 | Macadaan et al. | |
| 2008/0244655 A1 | 10/2008 | Mattila et al. | |
| 2008/0256233 A1 | 10/2008 | Hall et al. | |
| 2008/0281946 A1 | 11/2008 | Swildens et al. | |
| 2008/0313011 A1 * | 12/2008 | Rose | G06Q 30/02 705/7.32 |
| 2009/0019488 A1 | 1/2009 | Ruiz-Velasco et al. | |
| 2009/0055385 A1 | 2/2009 | Jeon et al. | |
| 2009/0100456 A1 | 4/2009 | Hughes | |
| 2009/0125511 A1 | 5/2009 | Kumar | |
| 2009/0235295 A1 | 9/2009 | Bell et al. | |
| 2009/0281851 A1 | 11/2009 | Newton et al. | |
| 2009/0326970 A1 * | 12/2009 | Estrada | G06Q 30/02 705/1.1 |
| 2010/0115060 A1 | 5/2010 | Julia et al. | |
| 2010/0121682 A1 * | 5/2010 | Abboa-Offei | G06Q 10/00 705/7.33 |
| 2010/0125351 A1 | 5/2010 | Davydov | |
| 2010/0177642 A1 | 7/2010 | Sebastian et al. | |
| 2010/0179986 A1 | 7/2010 | Sebastian et al. | |
| 2010/0179987 A1 | 7/2010 | Sebastian et al. | |
| 2010/0211432 A1 * | 8/2010 | Yiu | G06F 17/30867 705/7.32 |
| 2010/0220978 A1 | 9/2010 | Ogikubo | |
| 2010/0287033 A1 * | 11/2010 | Mathur | G06F 17/30867 705/319 |
| 2010/0306030 A1 | 12/2010 | Mawani | |
| 2010/0318484 A1 * | 12/2010 | Huberman | G06Q 30/02 706/46 |
| 2011/0029666 A1 | 2/2011 | Lopatecki et al. | |
| 2011/0060649 A1 | 3/2011 | Dunk et al. | |
| 2011/0082719 A1 | 4/2011 | Dutta | |
| 2011/0093415 A1 | 4/2011 | Rhee et al. | |
| 2011/0107363 A1 * | 5/2011 | Sanghavi | G06Q 30/02 725/23 |
| 2011/0173212 A1 | 7/2011 | Tuttle et al. | |
| 2011/0191449 A1 | 8/2011 | Swildens et al. | |
| 2012/0030587 A1 * | 2/2012 | Ketkar | G06F 17/30038 715/751 |
| 2012/0036048 A1 | 2/2012 | Robb et al. | |
| 2012/0054278 A1 * | 3/2012 | Taleb | G06Q 50/01 709/204 |
| 2012/0089623 A1 | 4/2012 | Sobotka et al. | |
| 2012/0102404 A1 | 4/2012 | Tiu, Jr. et al. | |
| 2012/0150626 A1 | 6/2012 | Zhang et al. | |
| 2012/0158630 A1 | 6/2012 | Zaman et al. | |
| 2012/0179822 A1 | 7/2012 | Grigsby et al. | |
| 2012/0185298 A1 | 7/2012 | Abboa-Offei | |
| 2012/0232999 A1 | 9/2012 | Roberts et al. | |
| 2012/0239489 A1 | 9/2012 | Peretti et al. | |
| 2013/0007792 A1 | 1/2013 | Jeon et al. | |
| 2013/0066973 A1 | 3/2013 | Macadaan et al. | |
| 2013/0080424 A1 | 3/2013 | Tuttle et al. | |
| 2013/0086159 A1 | 4/2013 | Gharachorloo et al. | |
| 2013/0091147 A1 | 4/2013 | Kim et al. | |
| 2013/0104026 A1 * | 4/2013 | Reynar | G06F 17/3087 715/234 |
| 2013/0110812 A1 | 5/2013 | Lakshmanan et al. | |
| 2013/0117349 A1 | 5/2013 | Burnette et al. | |
| 2013/0144750 A1 * | 6/2013 | Brown | G06Q 30/0631 705/26.7 |
| 2013/0159826 A1 | 6/2013 | Mason et al. | |
| 2013/0173609 A1 | 7/2013 | Tuttle et al. | |
| 2013/0179440 A1 | 7/2013 | Gordon | |
| 2013/0204825 A1 | 8/2013 | Su | |
| 2013/0212493 A1 | 8/2013 | Krishnamurthy | |
| 2013/0219255 A1 * | 8/2013 | van Hoff | G06F 17/2235 715/205 |
| 2013/0262575 A1 | 10/2013 | Xiong et al. | |
| 2013/0262627 A1 | 10/2013 | Black et al. | |
| 2013/0282796 A1 | 10/2013 | Sebastian et al. | |
| 2013/0282863 A1 | 10/2013 | Sebastian et al. | |
| 2013/0346154 A1 | 12/2013 | Holz et al. | |
| 2013/0346877 A1 | 12/2013 | Borovoy et al. | |
| 2014/0013353 A1 | 1/2014 | Mathur | |

(56) References Cited

U.S. PATENT DOCUMENTS

| | | |
|---|---|---|
| 2014/0020047 A1* | 1/2014 | Liebmann ............... H04L 63/20 726/1 |
| 2014/0025688 A1 | 1/2014 | Andler et al. |
| 2014/0074934 A1 | 3/2014 | van Hoff et al. |
| 2014/0089405 A1 | 3/2014 | Silbey et al. |
| 2014/0095307 A1 | 4/2014 | Dodson et al. |
| 2014/0108954 A1 | 4/2014 | Tonse et al. |
| 2014/0109125 A1 | 4/2014 | Kim et al. |
| 2014/0109139 A1 | 4/2014 | Jeon et al. |
| 2014/0129634 A1 | 5/2014 | Kim et al. |
| 2014/0130076 A1 | 5/2014 | Moore et al. |
| 2014/0136554 A1 | 5/2014 | Moradi et al. |
| 2014/0236673 A1* | 8/2014 | Smith ................... H04L 67/22 705/7.29 |
| 2014/0237093 A1 | 8/2014 | Hofman et al. |
| 2014/0244747 A1 | 8/2014 | Aggarwal et al. |
| 2014/0280606 A1 | 9/2014 | Long |
| 2014/0317106 A1 | 10/2014 | Tuttle et al. |
| 2014/0324579 A1 | 10/2014 | Macadaan et al. |
| 2014/0324848 A1 | 10/2014 | Tuttle et al. |
| 2014/0324953 A1 | 10/2014 | Seo et al. |
| 2014/0325547 A1 | 10/2014 | Roberts et al. |
| 2014/0344281 A1 | 10/2014 | Rao et al. |
| 2014/0351002 A1 | 11/2014 | Pessis et al. |
| 2014/0372563 A1 | 12/2014 | Ke et al. |
| 2015/0032504 A1 | 1/2015 | Elango et al. |
| 2015/0032848 A1 | 1/2015 | Sebastian et al. |
| 2015/0066948 A1 | 3/2015 | Carlton et al. |
| 2015/0067048 A1 | 3/2015 | Kannan et al. |
| 2015/0088635 A1 | 3/2015 | Maycotte et al. |
| 2015/0095329 A1 | 4/2015 | Sanio et al. |
| 2015/0120870 A1 | 4/2015 | Schuman |
| 2015/0156249 A1 | 6/2015 | Draznin et al. |
| 2015/0172145 A1* | 6/2015 | Skiba ................... H04L 67/10 709/224 |
| 2015/0220996 A1 | 8/2015 | Bhamidipati et al. |
| 2015/0281785 A1 | 10/2015 | Jeon et al. |
| 2015/0304339 A1* | 10/2015 | Liebmann ............... H04L 63/20 726/1 |
| 2015/0331553 A1 | 11/2015 | Shaffer |
| 2015/0379146 A1 | 12/2015 | Tonse et al. |
| 2016/0004394 A1 | 1/2016 | Macadaan et al. |
| 2016/0042072 A1 | 2/2016 | Laporte et al. |
| 2016/0048902 A1 | 2/2016 | Ward et al. |
| 2016/0098640 A1 | 4/2016 | Su |
| 2016/0117696 A1 | 4/2016 | Newton et al. |
| 2016/0269352 A1 | 9/2016 | Cashmore et al. |
| 2017/0161618 A1 | 6/2017 | Swaminathan et al. |
| 2018/0007061 A1* | 1/2018 | Liebmann ............... H04L 63/20 |
| 2019/0026788 A1* | 1/2019 | Garrity ............. G06Q 30/0276 |

* cited by examiner

METHOD OF DETERMINING AND TRANSMITTING POTENTIALLY VIRAL MEDIA ITEMS BASED ON THE VELOCITY MEASURE OF ANOTHER MEDIA ITEM EXCEEDING A VELOCITY THRESHOLD SET FOR THAT TYPE OF MEDIA ITEM

BACKGROUND

Millions of media items are published on a daily basis, but only a relative handful become wildly popular. The popularity of a media item (or "media content") can be related to how many different places it is published and how frequently it is shared and a very small percentage of the media items are designated as viral media items. A viral media item may be a media item that rapidly spreads throughout a portion of the population by being frequently shared (e.g., being posted, forwarded, marked as important or, otherwise shared by users, flagged, etc.). Extensive sharing of a media item can benefit from the so-called "network effect," whereby a person can share a media item with several friends, each of whom can share it with several friends and so on. A media item that is widely shared and gains a high degree of popularity due to the network effect is said to have gone "viral," and may be called a "viral media item".

BRIEF SUMMARY

According to implementations of the disclosed subject matter, a first media source may be scanned and media content may be identified based on at least one discovery criteria. The identification may be conducted based on determining that a link to the media content is present at least a threshold number of media sources or that a link to the media content has been engaged with a threshold number of times or engagement is increasing at a threshold speed or acceleration. The scanning may include retrieving one or more links to media content. A change in engagement rate for the first media item may be determined and a velocity measure for the media content may be determined based on determining the change in engagement rate for the media content. The arrangement may determine that the velocity measure for the first media content exceeds a velocity threshold and may publish a different media content based on determining that the first velocity measure for the first media content exceeds the velocity threshold. The different media content may be published on a media outlet such as a website, a blog, an aggregation page, an application, or the like. The different media content may be a derivative of the media content and/or may contain a link to the media content.

Systems and techniques according to the present disclosure generate viral media content. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

According to implementations of the disclosed subject matter, potentially viral media content may be identified and published before it has achieved viral status. The potentially viral media content may be identified by scanning one or more media sources. The media sources may be web pages, blogs, article publication websites, news websites, social media sites, or the like. A media source may be identified based on one or more criteria such as a predetermine selection, a sub source found within an original media source, or the like. Media content within the media source may be identified based on discovery criteria such as an engagement rate (e.g., number of times the content has been shared, viewed, otherwise accessed, etc.)) and the arrangement may calculate a velocity measure associated with the media content, as disclosed herein. The velocity measure may be based on a change in engagement rate for the media content. For example, the velocity measure may represent the change in shares per time unit for the media content. The arrangement may determine that the velocity measure for the media content exceeds a velocity threshold and, based on the determination, may take a subsequent action such as publishing related media content. The velocity threshold may be predetermined (e.g., a value such as 5 shares per minute, per minute), may be dynamically determined by the arrangement based on either the type of media content (e.g., image, video, text, etc.) or engagement rate (e.g., share, mention, etc.) or by aspects of the share behavior observed (e.g., type of users sharing, or amount and frequency of resharing). A publication of related media content may be an article or snippet derived from the media content such as an article about the media content, or any other applicable related media content as disclosed herein.

Figure 1:
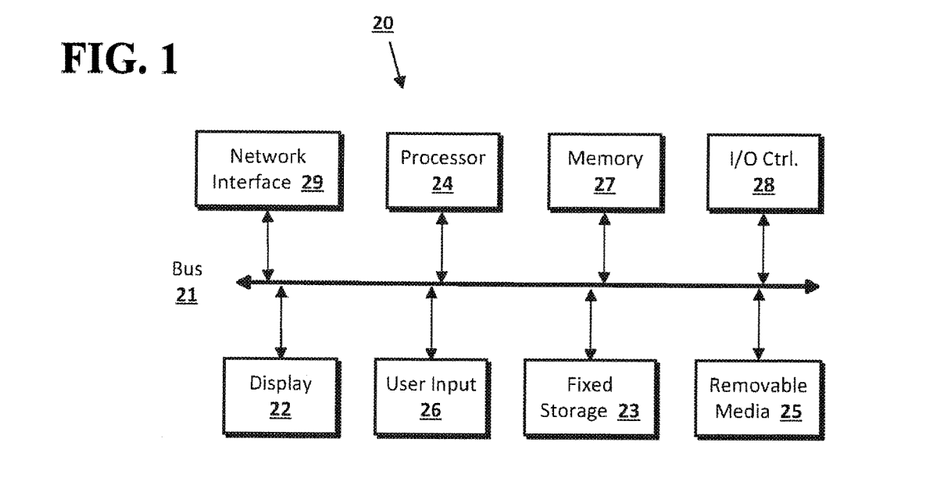
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. The fixed storage may store one or more, media content, URL links, related media content, velocity measure, engagement rate, change in engagement rate or the like. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected or communicated with in a similar manner (e.g., mobile devices, document scanners, image scanners, Bluetooth™ devices, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
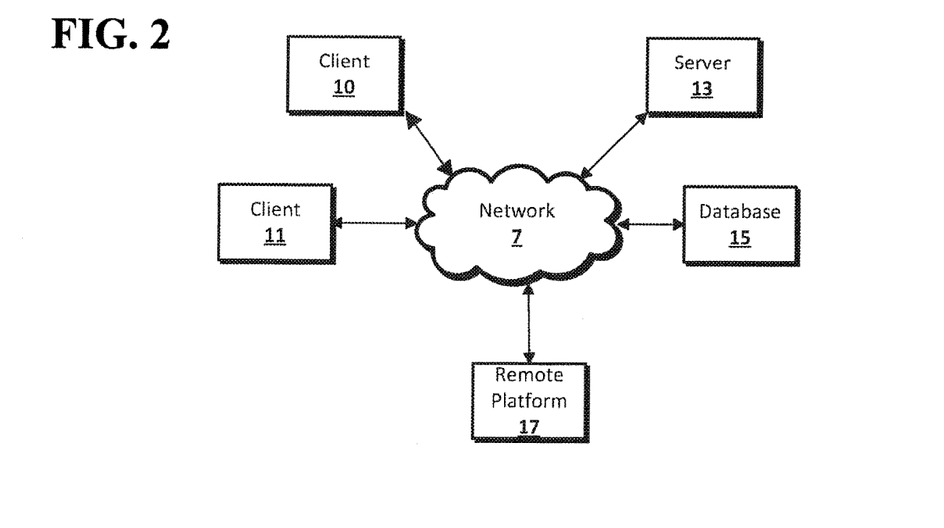
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, Blu-ray™ discs, DVD discs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
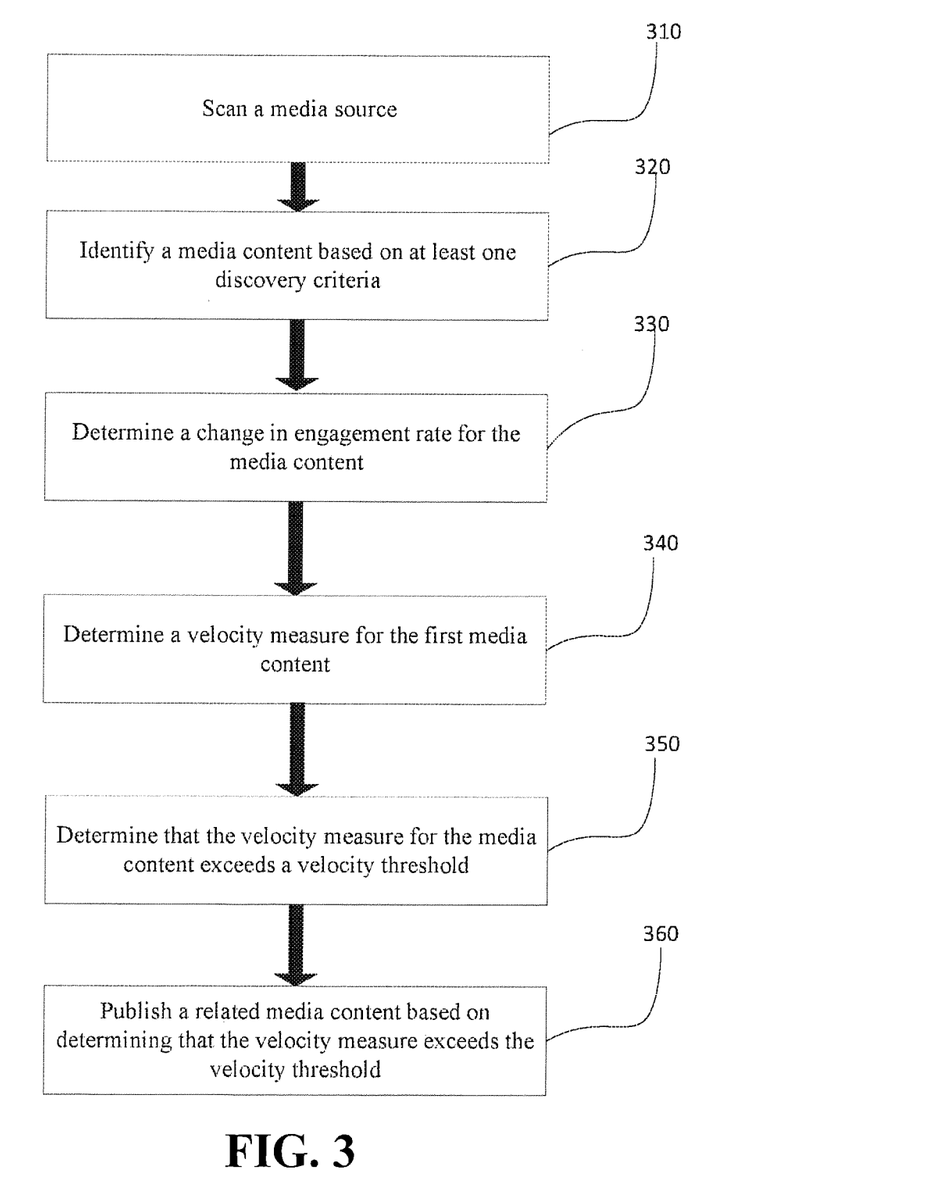
FIG. 3 shows an example process for publishing related media content, according to an implementation of the disclosed subject matter.

FIG. 3 shows an example process for an implementation of the disclosed subject matter. At step 310, the arrangement may scan a media source such as a website or a blog. At step 320, the arrangement may identify media content based on at least one discovery criteria and, at step 330, may determine a change in engagement rate for the identified media content. At step 340, a velocity measure for the media content may be determined and may be based on the change in engagement rate. The velocity measure may be derived from the change in engagement rate in any applicable manner such as by adding one or more weights to the change in engagement rate. At step 350, the arrangement may determine that the velocity measure for the media content exceeds a velocity threshold and, based on this determination, at step 360, may publish related media content. The related media content may be any applicable content as disclosed herein, such as content derived based on the media content.

According to implementations of the disclosed subject matter, as shown in FIG. 3 at step 310, the arrangement may scan a media source. A media source may be any applicable source such as a website, a blog, an aggregation page, an application, or the like. The source may be a news related source, entertainment related source, educational source, social media source, community form (e.g., a forum where members of the community provide content to the forum such that other members are provided access to the content via the forum), a comment (e.g., the source may be a comment on a forum, the comment submitted by a user in response to a news article to which the user responds to), a response (e.g., to a comment, to media content, etc.), or the like.

The arrangement may identify a media source to scan based on any applicable criteria such as a previously or currently identified media source by a human (e.g., a user may provide a media source for the arrangement to scan, a user may provide a type of media source for the arrangement to scan, etc.), or computer (e.g., a media source may be automatically identified based on parameters such as threshold traffic values, click through, amount of time spent on a page, or the like). The arrangement may further identify a second media source based on a first, initial, media source. The second media source may be extracted by identifying a connection to the second media source from the first media source. As an example, a first media source may contain links to other webpages. The arrangement may detect these links and designate the destination webpage corresponding to the one or more links as a media source.

One or more media source locations may be stored by the arrangement such that the one or more locations are accessible at a later time. Continuing the previous example, the second media source may be identified by the arrangement via the first source during a first time. The arrangement may store the location of the second media source (e.g., via a URL). At a second, subsequent time, the arrangement may access and scan the second media source based on the stored location.

The arrangement may scan one or more media sources at any applicable time period. The time period may be a constant time period such that the arrangement constantly scans all applicable media sources in a given order (e.g., chronological, priority based, etc.). The order may be determined dynamically based on predetermined criteria such as predefined variables that instruct the arrangement to implement a given order if a given criteria is satisfied. As an example, the arrangement may be instructed to constantly scan media sources in a priority based order between the hours of 12:00 am and 10:00 pm and on a chronological order between after 10:00 pm and before 12:00 am. Here, the priority may be determined based on the amount of traffic a media source is exposed to. It will be understood that the constant scanning may be limited by limiting factors such as computing power (e.g., server speed, server space, computing cost, etc.). Accordingly, the scan may be conducted constantly in view of any applicable limiting factors. Alternatively, a scan may be conducted during a predefined time period such as, for example, on an hourly basis. Alternatively, a scan may be conducted when a given criteria is satisfied. The criteria may be any applicable criteria such as when a media source is exposed to a minimum threshold amount of traffic different than the traffic exposure prior to a previous scan, updated media content on the media source (e.g., if 10 more article links are posted on the media source, then the arrangement may scan the media source).

According to an implementation of the disclosed subject matter, as shown at step 320, media content may be identified based on any applicable discovery criteria. The media content may be any applicable content such as an image (e.g., a JPEG, PNG, TIF, BMP, etc.), a video (e.g., an MPEG, AVI, MOV, etc.), an audio (e.g., a MP3, MP4, WAV, etc.), a graphics interchange format, a text string (e.g., an article, comment, blog post, an expert, a, paragraph, a sentence, a title, etc.) or the like. As a specific example a media content may be a video related to a user's experience in New York City posted by the user to a video sharing website. Additionally, a second user may provide a comment in association with the video regarding her experience in the same areas of New York City that are depicted in the video. Both the video and the comment may be identified as media content. Alternatively, the video may be identified as media content or the comment may be identified as media content. It will be understood that although specific examples of media content are provided herein, the implementations are not limited to those examples as any applicable media content may be identified by the arrangement.

Discovery criteria may be any applicable criterion that enables the arrangement to identify the media content as potentially viral content. The discovery criteria may be a threshold amount of engagement such as views, clicks, shares, posts, likes, suggestions, links to, and mentions of a given media content. As a specific example, the arrangement may track the number of times the link to an image has been posted across social media websites. If the number of times meets or exceeds a predetermined threshold, then the arrangement may identify the media content and track its engagement rate, as disclosed herein. Alternatively, the discovery criteria may be whether a given content is related to one or more of interest topics. The arrangement may be provided with or may determine of interest topics based on any applicable criteria such as current events (e.g., a sporting event), currently trending topics (e.g., a musical performance aired on television), topics that will become relevant based on anticipated events (e.g., a pending election), or the like. Accordingly, media content may be identified based on the topic that the content is associated with. As a specific example, a user may instruct the arrangement to flag content that is related to a financial crisis that may occur if certain actions are not taken by a national government within two days. Accordingly, the arrangement may scan a media source that contains an article which contains detailed analysis regarding the pending financial crisis by an expert in the field. Accordingly, the arrangement may identify the media content based on the user provided discovery criteria (e.g., content that is related to the financial crisis). As another example, the discovery criteria may be a threshold number media sources which contain links to the media content. More specifically, the arrangement may identify media content if the media content is linked to in a threshold number of media sources (e.g., at least 5 distinct sources).

At step 330, the arrangement may determine a change in engagement rate for the identified media content. An engagement rate may be a measure of a number of clicks, shares, likes, suggestions, posts, mentions, or the like. A click may be selection of the media content or a link to the media item by a user. Here, the arrangement may process the clicks through fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. As an example, a first user may view the media content via a social media platform and select an option to place a link for the media content on a page associated with another user within the same social media platform. A like may be associated with a user approval of, agreement with, and/or support towards media content. As an example, a user may select an icon associated with a media content to indicate agreement with the message provided by the media content. The selection may be visually presented to the user and/or other users as associated with the media content. A suggestion may be a recommendation of media content by a user. The suggestion may be directed at one or more other users or may be directed to a general population. A user may suggest specific media content to another user via any applicable manner such as via an electronic mail, an account user interface, a website, a social media platform, Short Messaging Service message, software, an application, or the like. As an example, a user may submit a link for media content to a second user's social media page. A post may be a publication of media content by a user such that one or more other users may view the publication. As an example, a user may post a link to media content on the user's social media page such that the post is seen by other users that are connected to the original user. A mention may be any applicable reference to media content and may be embedded within text, a share, a suggestion, a post, or the like. As an example, a user may provide a status via an instant messaging service. The status may include text along with a link to media content.

The arrangement may detect the engagement rate in any applicable manner such as by monitoring instances of the media content, monitoring instances of links to the media content, monitoring one or more sources (e.g., websites, blogs, etc.) via which a user may engage with the media content, or the like. As an example, the arrangement may track one or more social media websites and detect whenever a link to an article is posted via the social media website. Each post and/or a selection of link to the article may be designated as an engagement. The engagement may be recorded by the arrangement and stored at any applicable storage device such as a local server, a remote server, a cloud based server, a database, or the like. The arrangement may detect the engagement rate for given media content for a limited amount of time. The time may be determined based on a change in engagement rate, as disclosed herein, a predetermined time period, a time period determined based on an original engagement rate corresponding to when the media content was identified by the arrangement, or the like. As an example, the arrangement may determine that the media content is a video and, based on a predetermined value of 3 days for videos, may store the engagement rate for the media content for 3 days. Essentially, the arrangement may determine whether a media content is a potentially viral media content and, if it is not a potential media content, may stop monitoring the media content.

Figure 5:
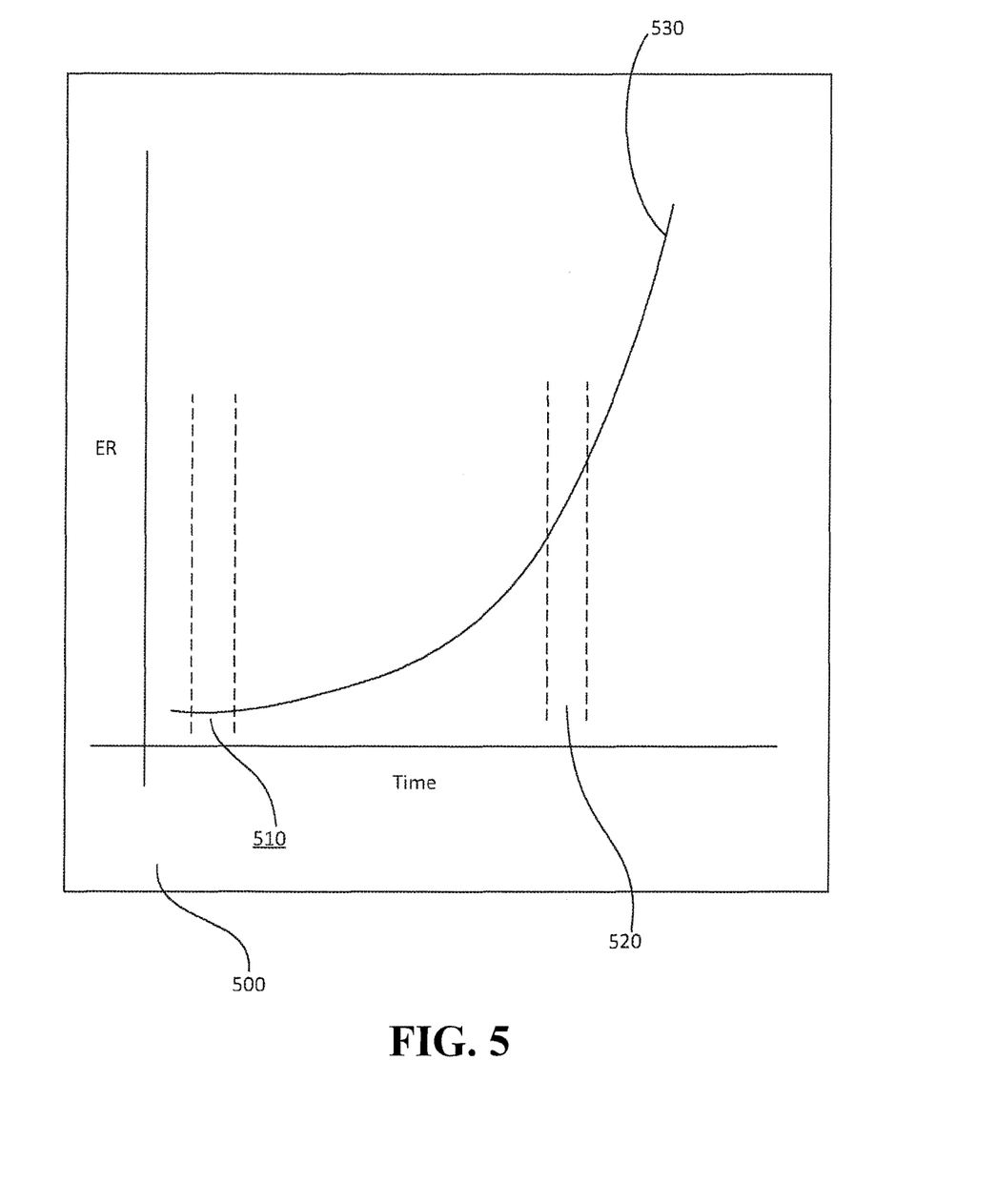
FIG. 5 shows an example illustration for change in engagement rate, according to an implementation of the disclosed subject matter.

A change in engagement rate for a media item may be calculated in any applicable manner such that an initial engagement rate is compared to a subsequent engagement rate. For example, the initial engagement rate may correspond to an engagement for a given period of time and the subsequent engagement rate may correspond to a subsequent period of time. As an illustrative example, FIG. 5 shows a graph 500 representing a rate of engagement related to a media content at a first time 510 and a second time 520 where the X axis correspond to time and the Y axis corresponds to the engagement rate for the media content. As shown, the engagement rate 530 may change at a slower pace at time 510 and a faster pace at time 520. Accordingly, the arrangement may determine the change in engagement rate based on the engagement rate at 510 and the change in engagement rate at 520. According to an implementation, the engagement rate for a first time may be based on a number of engagements during the time range corresponding to the first time. For example, the time range may be 1 minute and the number of clicks to a link recorded during a first minute may be 30. The number of clicks to a link recorded during a second minute may be 40. Accordingly, the change in engagement rate may be +10 clicks (i.e., the increase in number of clicks) or +33% (i.e., the percentage increase between the first minute and the second minute). Alternatively, the arrangement may take an average number of engagements during a first time (e.g., a first minute) and compare it to an average number of engagements during a second range (e.g., a second minute). For example, the first engagement rate may be calculated for the a first minute during which the average engagement is 3 clicks/second and a second engagement rate may be calculate for a second minute during which the average engagement rate is 4 clicks/second. Accordingly, the change in engagement rate may be +1 click/second or +25%.

The change in engagement rate may be conducted by the arrangement via any applicable entity such as a local server, a remote server, a cloud based server, a database, a computer, or the like. The change in engagement rate may be provided from a first entity to a second entity to calculate a velocity measure or, alternatively, the velocity measure may be calculated at the first entity that calculates the change in engagement rate.

According to an implementation of the disclosed subject matter, as shown at step 340 of FIG. 3, a velocity measure for a media content may be calculated and may be based on a change in engagement rate associated with the media content. According to an implementation, the velocity measure may be the change in engagement rate itself. For example, if the change in engagement rate for a media content is +1 click/second then the velocity measure for the media content may also be +1 click/second. According to an implementation, the velocity measure may be based on a normalized change in engagement rate. The change in engagement rate may be normalized based on any applicable criteria such as based on a predetermined normalization rate (e.g., if the predetermined normalization rate is 4 clicks/second then by dividing an engagement rate by 4 to determine a velocity measure), based on a current highest engagement rate (e.g., based on a media content that currently has the highest change in engagement rate, essentially resulting in a velocity measure that ranks media content in view of the media content with the highest change in engagement rate), based on an overall highest engagement rate (e.g., based on a media content that historically has the highest change in engagement rate over a given period of time), or the like. As a specific example, the highest change in engagement rate during a given day may be associated with a first media content. The change in engagement rate for a second media content may be calculated based on dividing the change in engagement rate for the second media content by the change in engagement rate for the first media content (i.e., the highest change in engagement rate for the day).

According to an implementation of the disclosed subject matter, in addition to the change in engagement rate, a velocity measure may be calculated based on one or more weights associated with one or more engagement rates and/or types of engagements. A type of engagement can be based on one or more of the source (the user (the "source user") and/or the site from which the media item is shared (the "source site")) of the engagement, the destination (the target user and/or destination site to which the media is shared) of the engagement, an attribute of the media being engaged (e.g., category, topic, length, size, authorship, metadata, keywords present in the media item), etc. The weights may be assigned to the one or more weights that are used to calculate the change in engagement rate for a media content. For example, as shown in FIG. 5, if a first engagement rate at 510 at a first time is compared to a second engagement rate at 520 at a second time, then a weight may be applied to the engagement rate associated with 510, 520, or both. For example, an engagement rate associated with a first time may not be weighted whereas the engagement rate associated with a second time may receive a 2× weight such that the engagement rate associated with the second time is counted twice as heavily as the first engagement rate. Accordingly, if the first engagement rate is 5 and the second engagement rate is 10, then the 2× weight may be applied to the second engagement rate such that the effective second engagement rate is 20. A velocity measure may be calculated by averaging the first engagement rate (i.e., 5) and the weighted second engagement rate (i.e., 20), resulting in a velocity measure of 12.5. Notably, a non-weighted velocity measure would be 7.5 based on the first engagement rate (i.e., 5) and non-weighted second engagement rate (i.e., 10). The weight associated with a first engagement rate may be different than a weight associated with a second engagement rate for the same media content. For example, an engagement rate associated with a first time may be weighted at 2× and the engagement rate associated with a second time may receive a 3× weight such that the engagement rate associated with the second time is counted 1.5 times as heavily as the first engagement rate. Accordingly, if the first engagement rate is 5 and the second engagement rate is 10, then the 2× weight may be applied to the first engagement rate such that the effective first engagement rate is 10 and a 3× weight may be applied to the second engagement rate such that the effective second engagement rate is 30. A velocity measure may be calculated by averaging the effective first engagement rate (i.e., 10) and the weighted second engagement rate (i.e., 30), resulting in a velocity measure of 20.

According to an implementation of the disclosed subject matter, the one or more weights associated with an engagement rate may be based on a recency of the one or more engagement rates. A heavier weight may be applied to an engagement rate that is more recent than an engagement rate that is less recent. For example, an engagement rate calculated at 2:15 pm, for a media content, may be weighted heavier than an engagement rate calculated at 1:15 PM the same day. Essentially, the arrangement may prioritize engagement rates that are more recent as they may more accurately indicate a trend in the popularity of a media content. Alternatively, a heavier weight may be applied to an engagement rate that is less recent than an engagement rate that is more recent. For example, an engagement rate calculated at 1:15 pm, for a media content, may be weighted heavier than an engagement rate calculated at 2:15 PM the same day. Essentially, the arrangement may prioritize engagement rates that are less recent as they may more definitively represent the popularity of a media content.

According to an implementation of the disclosed subject matter, the one or more weights associated with an engagement rate may be based on the type of the engagement rate. A type of engagement rate may be based on any action with respect to a media item, such as a click, a share, a like, a suggestion, a post, a mention, or the like. A click may be selection of the media content or a link to the media item by a user. Here, the arrangement may process the clicks through fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. A like may be associated with a user approval of, agreement with, and/or support towards media content. A suggestion may be a recommendation of media content by a user. The suggestion may be directed at one or more other users or may be directed to a general population. A user may suggest specific media content another user via any applicable manner such as via an electronic mail, an account user interface, a website, a social media platform, Short Messaging Service message, software, an application, or the like. A post may be a publication of media content by a user such that one or more other users may view the publication. A mention may be any applicable reference to media content and may be embedded within text, a share, a suggestion, a post, or the like.

Figure 6:
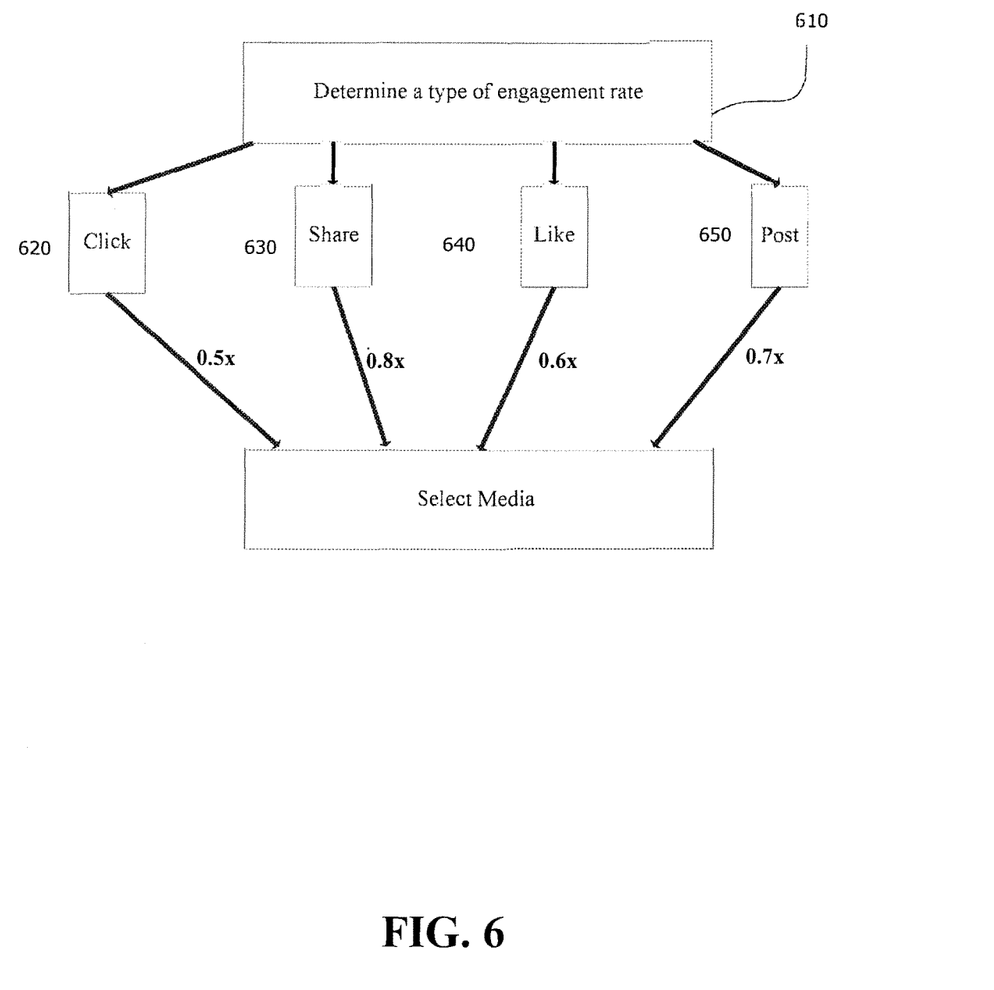
FIG. 6 shows an example process of selecting a weight, according to an implementation of the disclosed subject matter.

As an illustrative example, as show in FIG. 6, the arrangement may determine a type of engagement rate at 610. A click 620 may correspond to a weight of 0.5, a share 630 to a weight of 0.8×, a like 640 to a weight of 0.6× and a post 650 to a weight of 0.7×. Here, the arrangement may be configured to value a type of engagement rate in order of a share, post, like, and click such that a share is considered the most valuable and a click is considered the least valuable. Essentially, the arrangement may be configured such that a share, which may be the most visible of the types of engagements, is valued the highest and a click, which may be the least visible of the types of engagements is valued the lowest. Accordingly, if a media content is engaged with via a share, then that engagement is given a higher weight than if the media content is engaged with via a click.

According to an implementation of the disclosed subject matter, the one or more weights associated with an engagement rate may be based on the type of media. A type of media may be any media type such as an image, a video, an audio, a graphics interchange format, and a text string. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like.

Figure 7:
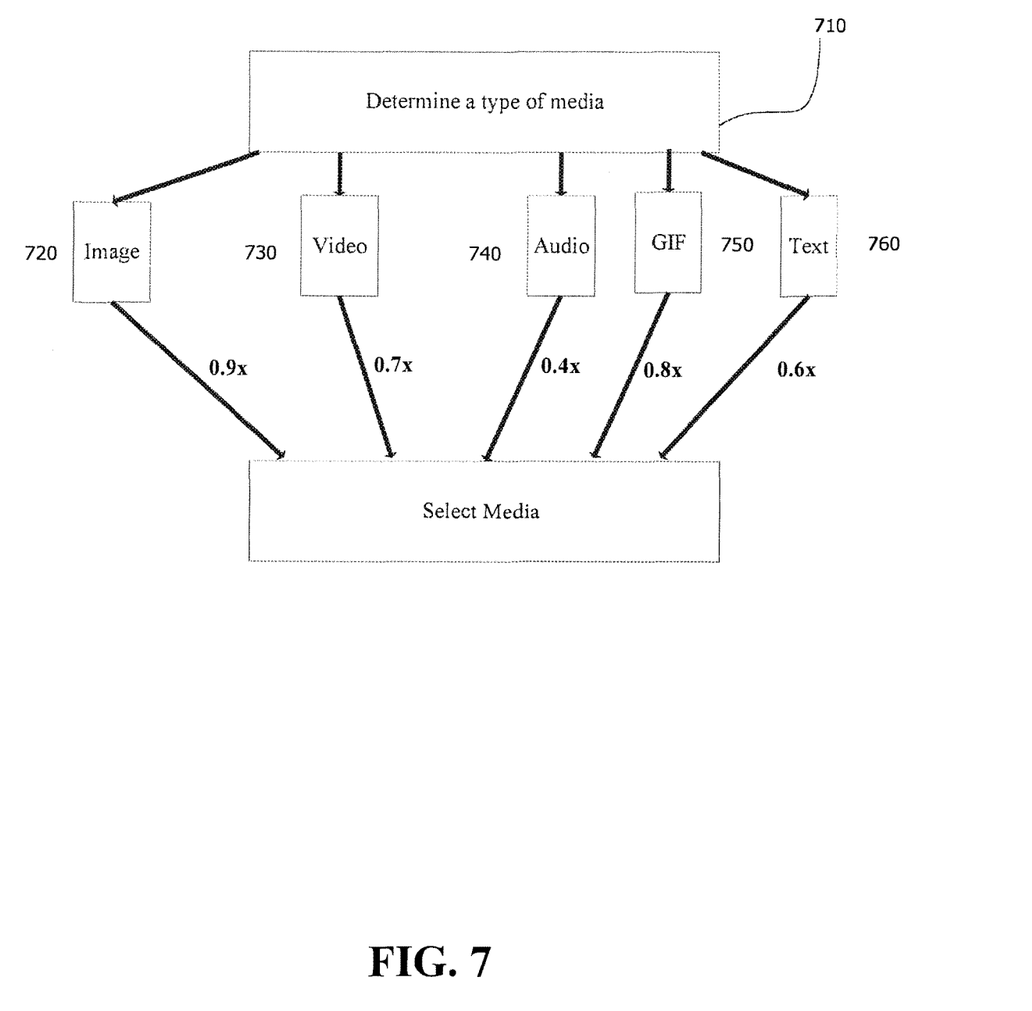
FIG. 7 shows another example process of selecting a weight, according to an implementation of the disclosed subject matter.

As an illustrative example, as shown in FIG. 7, the arrangement may determine a type of media at 710. An image 720 may correspond to a weight of 0.9×, a video 730 to a weight of 0.7×, an audio 740 to a weight of 0.4×, a GIF 750 to a weight of 0.8× and a text 760 to a weight of 0.6×. Here, the arrangement may be configured to value a type of media in order of an audio, a text, a video, a GIF, and an image such that an image is considered the most valuable and an audio is considered the least valuable. Essentially, the arrangement may be configured such that an image, which may be the most engaged of the types of engagements, is valued the highest and a text, which may be the least engaged of the types of engagements is valued the lowest. Accordingly, if a media type is an image, then that type is given a higher weight than if the media content is a text.

According to an implementation of the disclosed subject matter, as shown at step 350 of FIG. 3, the arrangement may determine that a velocity measure exceeds a velocity threshold. A velocity threshold may be provided by a user or may be determined by the arrangement. A user may provide a velocity threshold in any applicable manner such as via a user interface, prior to the arrangement identifying a media content, via an interface after a media content is identified by the arrangement, or the like. For example, a user may be prompted to input a velocity threshold prior to the arrangement identifying media content. The user may input a velocity threshold of 6.5 such that the arrangement determines that a velocity measure associated with a media content exceeds the velocity threshold when the velocity measure for the media content exceeds 6.5. Essentially, media content for which the velocity measure exceeds a velocity threshold may be considered potentially viral media.

Alternatively, a velocity threshold may be determined dynamically based on any applicable criteria such as an advertising campaign, a different media content, or the like. An advertising campaign may be one or more advertisements in any applicable format (e.g., image, video, audio, text, etc.) that may be associated with media content. As a specific example, an advertising campaign for sweaters may be configured such that the sweater manufacture indicates that they will pay X amount if their advertisements are associated with media content that is very popular and relevant to sweaters. Accordingly, the arrangement may determine that media content related to clothing articles is considered to be very popular at the velocity threshold of 6.0 based on clothing article media content for the past week. Therefore, the velocity threshold may be 6.0 based on the determination. As another example, on a given day, the average media content velocity measure for identified media content may be 4.0. The arrangement may determine that a velocity threshold is 200% of the average velocity measure on a given day. Accordingly, on the given day with the average velocity measure of 4.0, the arrangement may determine that the velocity threshold is 8.0 (200% of 4.0).

Figure 4:
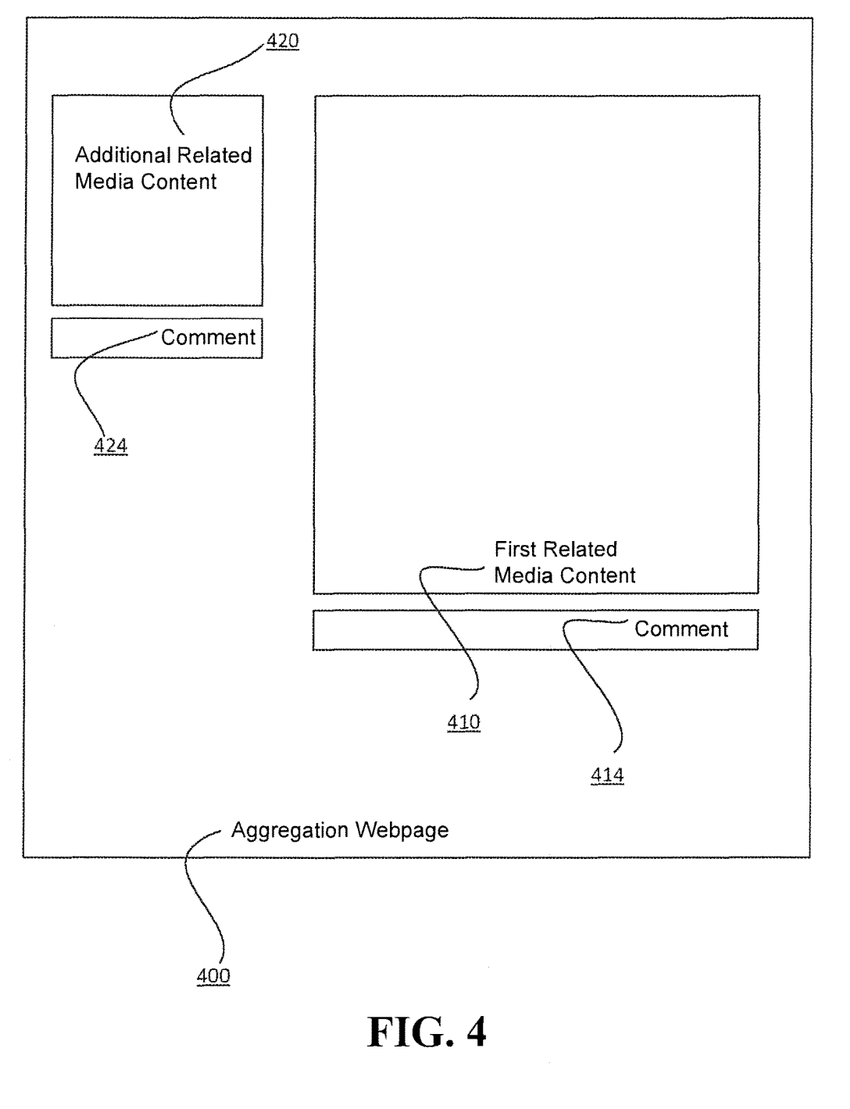
FIG. 4 shows an example illustration for published related media content, according to an implementation of the disclosed subject matter.

According to an implementation of the disclosed subject matter, as shown in FIG. 3, at step 360, media related to the media content may be published based on determining that the velocity measure for the media content exceeds the velocity threshold. The related media may be published on a media outlet such as a website, a blog, an aggregation page, an application, or the like. For example, the related media content may be published on a website that includes a plurality of related media content based on a plurality of original media content. As an illustrative example, FIG. 4 shows an aggregation webpage 400. The aggregation page 400 may contain a first related media content 410 which is a video reviewing a newly released electronic device. The first related media content 410 may be based on an article that highlights the main features of the newly released electronic device. Additionally, a comment 414 related to the first related media content 410 may be located directly under the first related media content 410. Similarly, the aggregation webpage 400 may contain an additional related media content 420 that is a derivative of an original media content. As shown, a comment 424 may be located below the related media comment 420.

According to an implementation of the disclosed subject matter, the related media may be any type of media such as a link, an image, a video, an audio, a graphics interchange format, and a text string. A link may be any applicable pointer to another interface such as a web resource identifier (e.g., a uniform resource locator, a uniform resource name, a uniform resource identifier, etc.), or the like. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like. The related media may contain an original media content on which the media content is based on. As an example, an original content may be a video showing a test drive of a new supercar. The related media content may be an article that describes the features and stylistic points of the new supercar. Alternatively or in addition, the related media content may be an article describing the new supercar as well as an embedded version (e.g., embedded into the webpage) of the video. Related media content may be a derivative of corresponding original media content. As an example, original media content may be a recently released song. Related media content corresponding to the recently released song may be a derivative of the song such that the related media may be they lyrics associated with the song or may be article that discusses the recently released song. Related media content may be automatically generated or may be provided by a user. As an example, related media content may be automatically generated and may be a link to an original media content such that selection of the link directs a user to the original media content. As another example, the arrangement may automatically extract a video clip and embed the video clip into a webpage other than the original location of the video clip. As an example of user provided related media content, a user may be exposed to media content and, based on the exposure, may draft an article discussing the media content. The drafted article may be the related media content.

As an example of an implementation of the disclosed subject matter, the arrangement may scan a community based website. The arrangement may identify a link to a music video from a comment on the community based website. The arrangement may determine that the link the music video has been shared 100 times within the blog as well as one other social media website that is monitored by the arrangement. Accordingly, the music video may be identified and stored at a remote server, based on the 100 shares. The arrangement may determine a change in engagement rate for the music video by determining the engagement rate for the music video on a first day and comparing to the engagement rate for the music video on a second day. The arrangement may determine that the change in engagement rate is 4 engages. Additionally, the arrangement may determine that the highest change in engagement rate for media content during a given week is 6 engages. The music video's change in engagement rate (i.e., 4 engages) may be normalized against the highest change in engagement rate (i.e., 6 engages) to generate a velocity measure of 0.66 for the music video. A velocity threshold of 0.5 may be generated by the arrangement and the music video may exceed the velocity threshold (i.e., 0.66>0.5). Accordingly, the arrangement may publish an article about the music video that contains the music video embedded within the article along with text associated with the music video. The article may be published on a media aggregation website that also contains one or more other related media items such that the one or more other related media items correspond to other media content, the other media content's velocity measure exceeding the velocity threshold (e.g., the same velocity threshold of 0.5 or a different velocity threshold). Essentially, here, the music video may be designated as potentially viral based on exceeding the velocity threshold and publishing the article related to the music video may catalyze the music video becoming viral.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    determining, at a server, a velocity measure for a first media content based on a determined change in an engagement rate for the first media content, wherein the engagement rate of the velocity measure is weighted based on an attribute of the first media content;
    determining, at the server, that the velocity measure for the first media content exceeds a velocity threshold that is dynamically determined based on a type of the first media content, wherein different types of media content have different velocity thresholds; and
    transmitting, by the server, a second media content that is selected from a plurality of scanned media sources, wherein the second media content is selected based on the first media content and based on the determining that the velocity measure for the first media content exceeds the velocity threshold.

2. The method of claim 1, wherein the transmitting comprises:
    publishing the second media content on a media outlet.

3. The method of claim 2, wherein the media outlet is selected from the group consisting of:
    a website, a blog, an aggregation page, and an application.

4. The method of claim 1, further comprising:
    scanning the first media source; and retrieving one or more links to media content.

5. The method of claim 1, further comprising:
    identifying the first media content based on at least one discovery criteria; and
    storing the first media content.

6. The method of claim 1, further comprising:
    identifying the first media content by determining that a link to the first media content is present in at least a threshold number of media sources.

7. The method of claim 1, further comprising:
    identifying the first media content by determining that a link to the first media content has been engaged a threshold number of times.

8. The method of claim 7, wherein determining that a link to the first media content has been engaged a threshold number of times comprises storing the number of times a media item has been engaged.

9. The method of claim 1, wherein determining a change in engagement rate for the first media content comprises:
    determining a first engagement rate based on a first number of engagements per first unit time;
    determining a second engagement rate based on a second number of engagements per second unit time; and
    determining the change in engagement rate based on the first engagement rate and the second engagement rate.

10. The method of claim 9, wherein determining the velocity measure comprises:
    assigning a first weight to the first engagement rate;
    determining a weighted change in engagement rate based on the weighted first engagement rate and the second engagement rate; and
    determining the velocity measure based on the weighted change in engagement rate.

11. The method of claim 10, wherein the first weight is based on the recency of the first engagement rate.

12. The method of claim 10, wherein the first weight is based on a type of the first engagement rate.

13. The method of claim 12, wherein the type of the first engagement rate is selected from the group consisting of: a click, a share, a like, a suggestion, a post, a mention, a source user, a destination user, a source site, and a destination site.

14. The method of claim 10, wherein the first weight is based on a type of media.

15. The method of claim 14, wherein the type of media is selected from the group consisting of: an image, a video, an audio, a graphics interchange format, and a text string.

16. The method of claim 9, further comprising:
    assigning a first weight to the first engagement rate and a second weight to the second engagement rate;
    determining a weighted change in engagement rate based on the weighted first engagement rate and the weighted second engagement rate; and
    determining the velocity measure based on the weighted change in engagement rate.

17. The method of claim 1, wherein the velocity measure is based on normalizing the change in the engagement rate.

18. The method of claim 1, wherein the velocity threshold is provided by a user.

19. The method of claim 1, wherein the velocity threshold is dynamically determined based on an advertising campaign.

20. The method of claim 1, wherein the velocity threshold is dynamically determined based on a velocity measure corresponding to at least a third media content.

21. The method of claim 1, wherein the second media content is a derivative of the first media content.

22. The method of claim 1, wherein the second media content contains a link to the first media content.

23. The method of claim 22, wherein the link is a uniform resource locator.

* * * * *